United States Patent
Johnson

(10) Patent No.: US 6,870,481 B2
(45) Date of Patent: Mar. 22, 2005

(54) SYSTEM AND METHOD FOR MONITORING CONNECTIONS IN A RAIL ASSEMBLY

(75) Inventor: Richard R. Johnson, Ann Arbor, MI (US)

(73) Assignee: Syron Engineering & Manufacturing, L.L.C., Saline, MI (US)

( * ) Notice: Subject to any disclaimer, the term of this patent is extended or adjusted under 35 U.S.C. 154(b) by 108 days.

(21) Appl. No.: 10/452,524

(22) Filed: Jun. 2, 2003

(65) Prior Publication Data

US 2003/0222771 A1 Dec. 4, 2003

Related U.S. Application Data

(60) Provisional application No. 60/385,376, filed on Jun. 3, 2002.

(51) Int. Cl.⁷ .............................................. G08B 21/00
(52) U.S. Cl. ............................. 340/686.1; 340/686.4; 483/4
(58) Field of Search .................... 340/686.1, 686.4, 340/679, 680, 687, 686.2; 483/4; 901/2, 3, 6; 235/375, 383

(56) References Cited

U.S. PATENT DOCUMENTS

| | | | | |
|---|---|---|---|---|
| 4,510,684 A | * | 4/1985 | Hutchins et al. | 29/703 |
| 4,608,645 A | * | 8/1986 | Niwa et al. | 700/176 |
| 4,660,274 A | * | 4/1987 | Goumas et al. | 483/7 |
| 4,679,297 A | * | 7/1987 | Hansen et al. | 483/1 |
| 4,742,470 A | * | 5/1988 | Juengel | 700/175 |
| 4,821,198 A | * | 4/1989 | Takeuchi et al. | 700/116 |
| 4,835,711 A | * | 5/1989 | Hutchins et al. | 700/247 |
| 4,890,241 A | * | 12/1989 | Hoffman et al. | 700/255 |
| 5,257,199 A | * | 10/1993 | Tsujino et al. | 700/160 |
| 6,456,898 B1 | * | 9/2002 | Modesto et al. | 700/206 |

* cited by examiner

Primary Examiner—John Tweel, Jr.
(74) Attorney, Agent, or Firm—Carlson, Gaskey & Olds

(57) ABSTRACT

A system and method for a rail assembly ensures that the correct arms are connected to the correct receivers. Each arm has a unique associated arm code, and each receiver is assigned a unique receiver code based on the job to be performed by the rail assembly. After the arms are connected to the receivers, a processor compares the receiver code of each receiver with the arm code of the arm inserted in that receiver. If the two codes do not match, the system generates an alert to notify the user of the improper connection. The alert may be an audible alert, a visual alert, and/or an operational stoppage of the rail assembly.

16 Claims, 2 Drawing Sheets

SYSTEM AND METHOD FOR MONITORING CONNECTIONS IN A RAIL ASSEMBLY

REFERENCE TO RELATED APPLICATIONS

The present invention claims priority to U.S. Provisional Patent Application No. 60/385,376, filed Jun. 3, 2002.

TECHNICAL FIELD

The present invention relates generally to a coding system for rail assemblies, and more particularly a system for detecting an improper connection between two components of a rail assembly.

BACKGROUND OF THE INVENTION

Rail assemblies are often used in manufacturing systems to move and grip objects. Known rail assemblies usually include removable arms mounted in receivers, which are attached to a rail. Commonly, a plurality of receivers are disposed along the length rail so that properly connected arms facilitate moving and gripping of objects.

Once an arm is mounted in the receiver, it may desirable to determine whether the arm is properly connected into the receiver. However, because the end of the arm is encased in the receiver, it may be impossible to determine if the arm is properly mounted through a visual inspection of the connection.

Further, different job processes may require different types of arms. Thus, it is possible to mount an arm that is incorrect for a given job into the receiver due to operator error. If the job begins with an incorrect arm, the rail assembly may need to be shut down to correct the error. Although sensors and/or mechanical keying systems may be incorporated into the rail assembly to detect whether the arm is fitted correctly into the receiver, currently known systems are unable to detect whether a given arm inserted into the receiver is correct for a particular job. Thus, even though there are ways to determine whether the physical connection between the arm and the receiver is secure, there is currently no known way to determine whether the arm is correct for a particular job.

There is a desire for a system that can detect whether a correct arm for a given job is correctly fitted into a receiver.

SUMMARY OF THE INVENTION

The present invention is directed to a system and method for ensuring correct connection between the arms and receivers in a rail assembly. In one embodiment, each arm has a unique associated arm code, and each receiver is assigned a unique receiver code based on the job to be performed. When the arms are inserted into the receivers, a processor compares the receiver code of each receiver with the arm code of the arm inserted in that receiver. If the two codes match, it indicates that the correct arm is inserted into the correct receiver. If the two codes do not match, the system generates an alert to notify the user of the improper connection. The alert may be an audible alert, a visual alert, and/or an operational stoppage of the rail assembly.

Because each arm may have a unique arm code, it is possible to assign receiver codes for any given job based on the arm codes and therefore ensure that the attached arms are appropriate for both the rail assembly and the specific job being conducted by the rail assembly.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
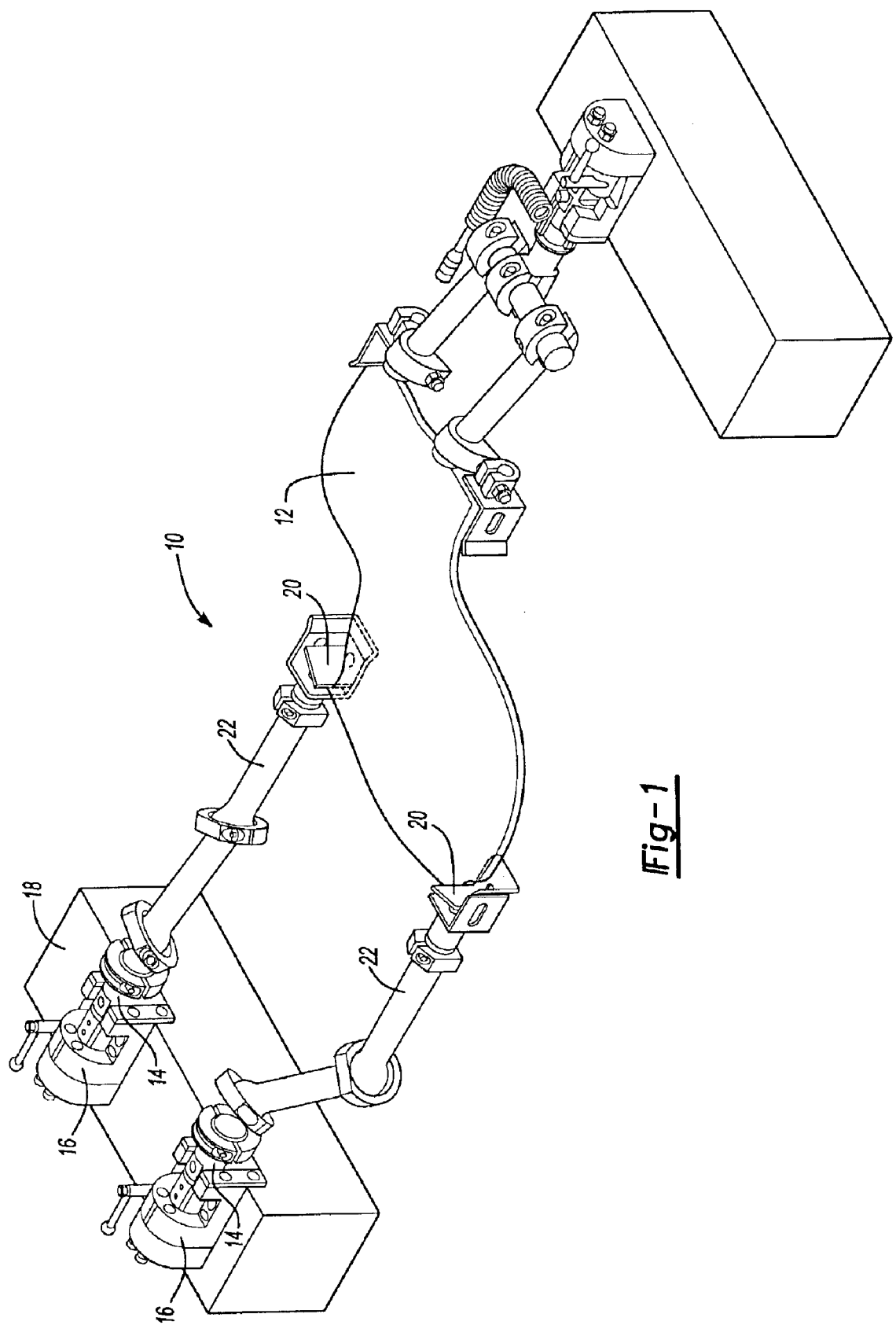
FIG. 1 illustrates a perspective view of a rail assembly in which the invention may be used.

FIG. 1 illustrates one embodiment of a rail assembly 10 for gripping and moving an object 12. A multi-functional arm 14 is mounted in a receiver 16 that is attached to a rail 18. Although FIG. 1 shows only three receivers 16, it is to be understood that any number of receivers 16 can be attached to each rail 18 in the assembly 10. A ball jointed link 22 attached to the arm 14 is attached to a gripper 20 to grip the object 12. Although a ball jointed link 22 is described, it is to be understood that alternative joints are possible. Once properly mounted, the arm 14 is then locked in the receiver 16 with any known locking mechanism.

Figure 2:
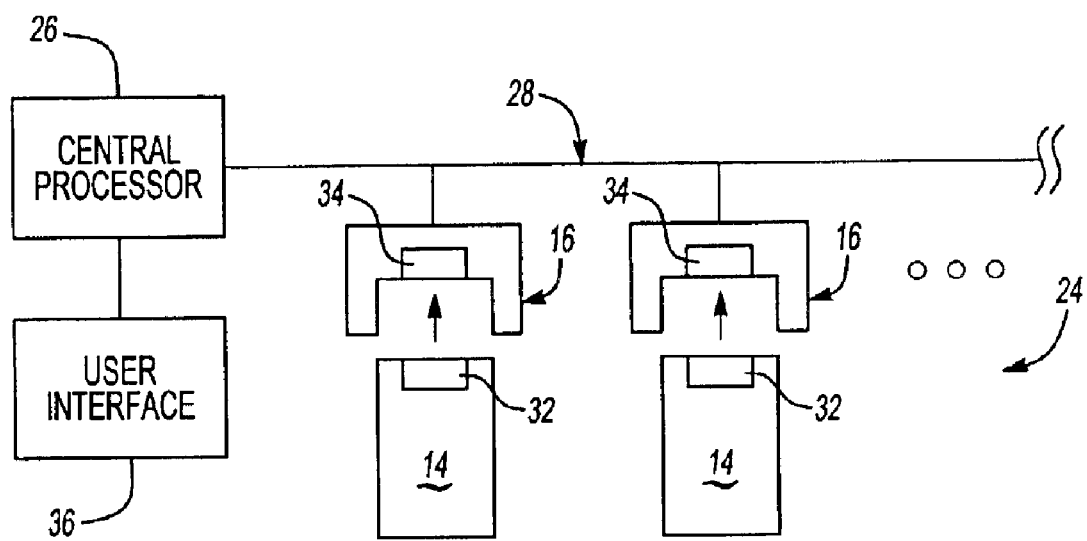
FIG. 2 is a block diagram illustrating one embodiment of the invention.

FIG. 2 is a block diagram illustrating a sensor system 24 that can be used in conjunction with the rail receiver assembly 10. The rail assembly 10 includes an arm 14 inserted into a receiver 16. The sensor system 24 is used to determined whether the arm 14 is inserted into the correct receiver 16 for the correct job. Generally, the sensor system 24 checks whether a code associated with the arm 14 matches a code associated with the receiver 16. If the codes match, this indicates that the correct arm 14 is placed in the correct receiver 16 for the correct job.

In one embodiment of the present invention, the sensor system 24 includes a central processor 26 that communicates with the receivers 16 via a communication bus 28. Although serial communication busses are normally used in manufacturing systems, the inventive system 24 can use any communication system and structure for the bus 28, such as a plurality of wires disposed along the rail 18 connecting the central processor 26 to the receivers 16 or wireless devices that transmit and receive data between the central processor 26 and the receivers 16. In other words, the communication bus 28 allows the central processor 26 to exchange data with the receivers 16. The central processor 26 itself can be any appropriate device, such as a programmable logic controller or other type of computer.

Different types of arms 14 can be mounted in each receiver 16 depending on the type of job is to be performed. When the job changes, the arms 14 are commonly changed by the operator manually. Because of the potential for human error, it is important that the correct arm 14 is properly mounted in the receiver 16. In one embodiment of the invention, each arm 14 has a unique arm code 32, such as a unique serial number or other identifier that identifies the particular arm 14. This code may be implemented via any electronically-readable means, such as a microprocessor. Each receiver 16 includes its own receiver code 34 that is implemented in a form compatible with the arm code 32. Note that the respective codes 32, 34 do not need to be provided by any specific physical device; the codes can be implemented in any desired fashion that allows the central processor 26 to determine whether the arm code 32 and the receiver code 34 correspond to each other (e.g., match each other).

The receiver code 34 may be controlled by the central processor 26. For example, the central processor 26 may set the receiver code 34 for each receiver 16 in the rail assembly 10 based on a particular job type. When the arm 14 is mounted in the receiver 16, the sensor system 24 checks whether the arm code 32 matches the receiver code 34.

In one embodiment, the arm code 32 and the receiver code 34 are both sent to the central processor 26 via the communication bus 28, and the central processor 26 determines whether the codes 32, 34 match. The central processor 26 may also set the receiver code 34 and receive only the arm code 32 to conduct the comparison.

Alternatively, the receiver 16 itself may include its own processor (not shown) to set the receiver code 34 and determine whether the codes 32, 34 match; in this case, the receiver 16 will send the results of the comparison back to the central processor 26 via the communication bus 28. Although the description below focuses on an embodiment where the central processor 26 sets the receiver code 34 and conducts the comparison between the receiver identifier 34 and the arm code 32, those of skill in the art will understand that some or all of these functions can be carried out elsewhere in the sensor system 24 (e.g., in one or more processors disposed in the receivers 16 in the rail assembly 10).

If the central processor 26 detects a receiver 16 whose receiver code 34 does not match the arm code 32 of the arm 12 that it is holding, the central processor 26 will send an alert signal to a user interface 36 to alert the operator of the error. The user interface 36 can be any device that can communicate information to the user, such as a computer monitor, visual display, or audible warning signal. Alternatively, or in addition to the user alert, the central processor 26 may suppress operation of the rail assembly 10 altogether until all of the receivers 16 have arms 14 having arm codes 32 that match the receiver codes 34.

By alerting the user to the error, the inventive sensor system 24 gives the user to chance to remove the incorrect arm 14 from the receiver 16 and replace it with the correct arm 14 before the rail assembly 10 even begins operation on the current job.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A sensor system for a rail assembly having an arm and a receiver, comprising:
   a processor that compares an arm code associated with the arm and a receiver code associated with the receiver; and
   an interface that generates an alert if the processor indicates that the arm code and the receiver code do not correspond with each other.

2. The sensor system of claim 1, wherein the processor is a central processor that sets the receiver code and receives the arm code to compare the arm code with the receiver code.

3. The sensor system of claim 1, wherein the processor is a central processor that receives the receiver code from the receiver and the arm code from the arm to compare the arm code with the receiver code.

4. The sensor system of claim 3, wherein the central processor sets the receiver code.

5. The sensor system of claim 1, wherein the processor is disposed in the receiver, and wherein the sensor system further comprises a central processor that receives a result of the comparison between the arm code and the receiver code from the processor.

6. The sensor system of claim 1, wherein the interface is at least one selected from the group consisting of an audible alert, a visual alert, and an operational stoppage of the rail assembly.

7. A rail assembly, comprising:
   at least one rail;
   at least one receiver disposed on said at least one rail, each receiver having a receiver code;
   at least one arm connected to said at least one receiver, each arm having an arm code;
   a central processor that sets the receiver code and indicates the result of a comparison between the arm code of each arm and the receiver code of the receiver corresponding to each arm; and
   an interface that generates an alert if the central processor indicates that the arm code and the receiver code do not match.

8. The rail assembly of claim 7, wherein the central processor receives the arm code to compare the arm code with the receiver code.

9. The rail assembly of claim 7, wherein the central processor receives the receiver code from the receiver and the arm code from the arm to compare the arm code with the receiver code.

10. The rail assembly of claim 7, wherein each of said at least one receivers has a corresponding processor that sends a result of the comparison between the arm code and the receiver code to the central processor.

11. The rail assembly of claim 7, wherein the interface is at least one selected from the group consisting of an audible alert, a visual alert, and an operational stoppage of the rail assembly.

12. The rail assembly of claim 7, wherein said at least one receiver comprises a plurality of receivers and said at least one arm comprises a plurality of arms, and wherein each of said plurality of arms has a unique arm code.

13. A method of checking a connection between an arm and a receiver connected together in a rail assembly, comprising:
   comparing an arm code associated with the arm and a receiver code associated with the receiver; and
   generating an alert if the arm code and the receiver code do not match.

14. The method of claim 13, further comprising setting the receiver code.

15. The method of claim 14, wherein the rail assembly has a plurality of receivers, and wherein the setting step comprises setting the receiver codes corresponding to the plurality of receivers based on unique arm codes corresponding to a plurality of arms.

16. The method of claim 13, wherein the generating step is at least one selected from the group consisting of generating an audible alert, generating a visual alert, and stopping operation of the rail assembly.

* * * * *